United States Patent [19]

Warner

[11] 4,247,769
[45] Jan. 27, 1981

[54] APPARATUS FOR MEASURING ANGULAR AND LINEAR DISPLACEMENTS

[75] Inventor: David A. Warner, Cambridge, Mass.

[73] Assignee: The Charles Stark Draper Laboratory, Inc., Cambridge, Mass.

[21] Appl. No.: 971,655

[22] Filed: Dec. 21, 1978

[51] Int. Cl.³ .................................................. G01D 5/34
[52] U.S. Cl. ........................ 250/231 SE; 250/237 G
[58] Field of Search .................. 250/231 SE, 237 G; 356/395

[56] References Cited

U.S. PATENT DOCUMENTS

| | | |
|---|---|---|
| 3,054,902 | 9/1962 | Timms et al. |
| 3,056,029 | 9/1962 | Budnick |
| 3,076,374 | 2/1963 | DeNeergaard |
| 3,217,590 | 11/1965 | Lawrence |
| 3,244,063 | 4/1966 | Lawrence |
| 3,295,214 | 1/1967 | DeNeergaard |
| 3,309,525 | 3/1967 | Johnson |
| 3,344,700 | 10/1967 | Brake ................... 250/237 G |
| 3,400,275 | 9/1968 | Trump |
| 3,524,067 | 8/1970 | West ...................... 250/237 G |
| 3,544,800 | 12/1970 | Elliott |
| 3,553,469 | 1/1971 | Stutz et al. |
| 3,706,424 | 12/1972 | Gardner |
| 3,720,970 | 11/1973 | Trump |
| 3,755,682 | 8/1973 | Russell |
| 3,757,128 | 9/1973 | Vermeulen |
| 3,836,260 | 9/1974 | Ulganov et al. |
| 3,842,261 | 10/1974 | MacGovern et al. |
| 3,912,926 | 10/1975 | Coulbourn |
| 3,935,447 | 1/1976 | Black et al. |
| 3,944,821 | 3/1976 | Pierrat |
| 3,995,156 | 11/1976 | Angersbach et al. |
| 4,074,128 | 2/1978 | Harris et al. |

Primary Examiner—David C. Nelms
Assistant Examiner—Darwin R. Hostetter
Attorney, Agent, or Firm—Kenway & Jenney

[57] ABSTRACT

An optical apparatus for measuring angular or linear displacements. The apparatus comprises a single planar element having on its surface a pattern of sectors characterized by alternating optical transmission coefficients. An optical system superimposes a real image of a portion of the pattern upon that portion of the pattern itself. This image moves in the direction opposite to the planar element, so that as the element moves, the interaction of the sectors of the image with the sectors themselves creates alternating light and dark areas as a result of shuttering or interference effects. A light sensor monitors these light and dark areas thereby providing a measure of the displacement of the planar element.

15 Claims, 8 Drawing Figures

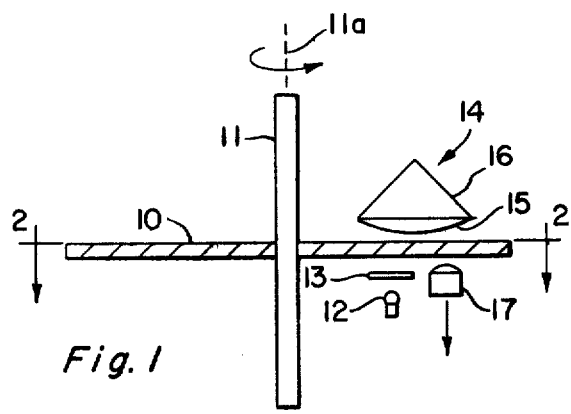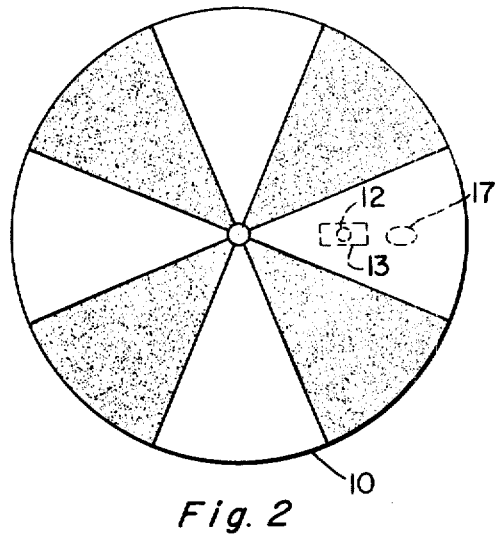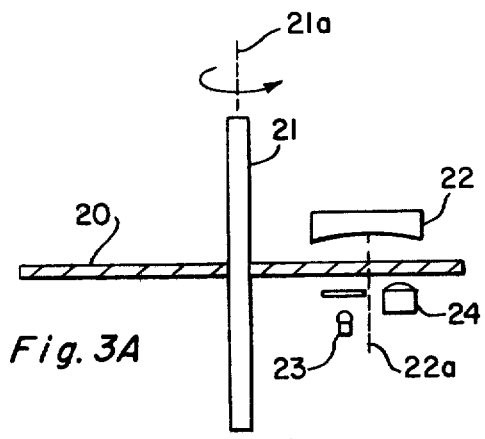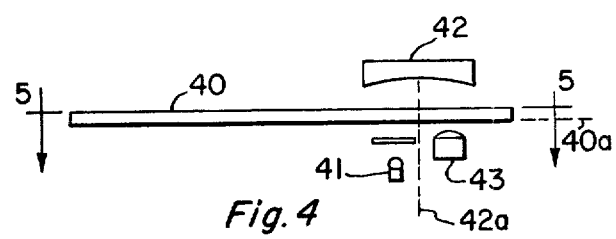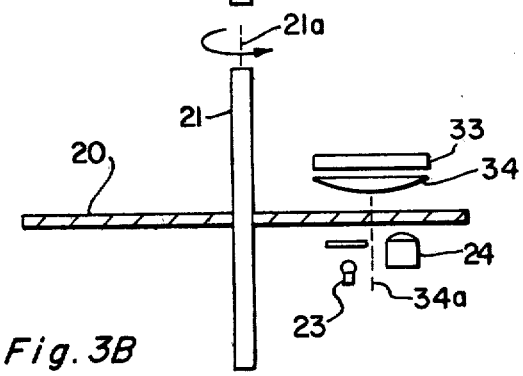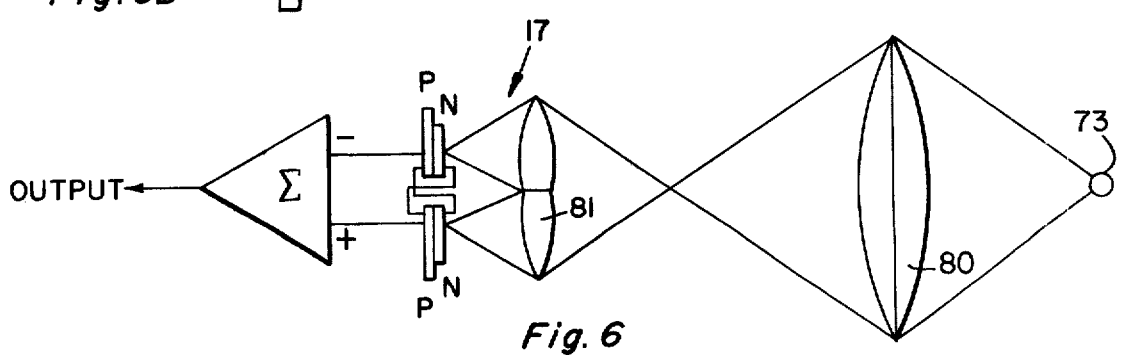

APPARATUS FOR MEASURING ANGULAR AND LINEAR DISPLACEMENTS

BACKGROUND OF THE INVENTION

This invention relates to optical apparatus for the measurement of linear and angular displacements and more particularly to such apparatus capable of extreme accuracy, e.g., the measurement of angular orientation with sub-arcsecond precision.

Previously known optical shaft encoders, though capable of precision measurement under favorable conditions, are deficient in several respects. To minimize the various aberrations inherent in optical systems, the prior art devices, such as the Theodosyn, required complex optical systems comprising as many as thirty optical surfaces. Notwithstanding this use of multiple optical elements, these devices are still plagued with abberations. And not only are such complex optics very expensive, but equally important, proliferating optical elements increase the likelihood of precision degrading mechanical misalignments in a vibratory environment. In addition to complex optical arrangements, some known devices require multiple encoded discs for precision angle measurement, again adding to cost and complexity.

It is therefore an object of the present invention to provide an improved optical device capable of precisely measuring linear and angular displacements.

Another object is to provide such a device which employs a single encoded element and a virtually aberration free optical system having a single or a very few optical surfaces.

Yet a further object of the invention is to produce an optical measuring apparatus that is more highly stable and accurate than before known.

Other objects, features and advantages of the system will become apparent in what follows.

SUMMARY OF THE INVENTION

The apparatus for accurate measurement of linear or angualr displacements according to the present invention employs a single planar element having on its surface a pattern of alternating sectors characterized by different optical transmission coefficients, such as opaque and transparent. This element is arranged for linear or angular displacement within the plane of the element along or about a reference axis, respectively. The linear or angular position of the planar element with respect to the reference axis is measured by one or more optical sensorheads.

Each of the optical sensorheads includes an optical system for generating a real image of a portion of the pattern passing a reference point and for superimposing that image on the portion of the pattern so that the image and pattern move in opposite directions as the planar element moves. An associated sensor detects the optical density of a region of the superimposed image and the corresponding portion of the pattern.

In one form of the invention, where the sectors are alternately opaque and transparent, each of the sensorheads comprises a reflective, inverting, real image forming optical system disposed on a first side of the planar element and positioned so that the alternating transparent and opaque regions cross the field of view of the optical system. The normal to the planar element and the optical axis of the optical system are parallel and the planar element and optical system are spaced apart such that the planar element is located at or near the plane of unit magnification.

Each sensorhead also includes a light source disposed on the second side of the planar element. The source is adapted to illuminate a portion of the planar element which includes portions of the pattern of opaque and transparent regions as they pass by. The light which passes through the transparent regions of the planar element is reflected by the optical system and forms a real image of the pattern which is superimposed on the pattern itself. Because the image is inverted, it moves in the direction opposite to the direction of displacement of the portion of the planar element passing by the field of view of the optical system. This opposed motion of the pattern and its image creates alternating light and dark areas as a result of shuttering or interference effects.

The alternation or motion of these light and dark areas is indicative of the linear or angular position of the planar element. The sensorhead includes a light sensor, also disposed on the second side of the planar element, which monitors the motion of these light and dark areas.

For precision measurement of angular orientation of a reference element, such as a shaft, the planar element is a circular disc mounted on the rotatable shaft through the disc's center. In this case, the pattern of alternating opaque and transparent regions comprises equal area radial sectors of the disc. To insure that these sectors across the optical system field of view in a single direction as the shaft rotates, the optical axis is offset laterally from the shaft.

In a preferred embodiment of the invention for precision angle measurement, the optical system comprises a convex lens-prism combination. Such an optical arrangement creates an image which is erect about an axis normal to the radial sectors on the disc but which still counter-rotates with respect to the angular rotation of the disc. Because of the erection of the image about a single axis, the wide and narrow portions of the image of the radial sectors are superimposed respectively upon the wide and narrow portions of the sectors themselves. In this way, a nearly complete shuttering of the light is accomplished, creating the alternating light and dark areas as the disc rotates. In this embodiment, a light emitting diode or a laser diode is the preferred illuminating source. It is also preferred that the sensing means be a light sensitive semiconductor or a bi-lens detector which can very precisely locate the center of luminosity of the light and dark bands.

To compensate for any eccentricity in the mounting of an encoded disc on a rotatable shaft, it is preferred that two or more sensorheads be used. The signals from the sensorheads are electronically manipulated to eliminate errors due to the eccentricity.

In another preferred embodiment of the invention for angle measurement, the optical system is a single spherical concave mirror which forms a non-erected image of the sectors which counter-rotates in relation to the disc. The close interaction of the sectors and their images gives rise to interference effects manifested as moving hyperbolic moire fringes or bands. It is the changing light level at the light sensor due to fringe motion which allows the angular orientation of the disc so accurately to be measured. A bi-lens detector is the preferred light sensor in this embodiment.

For measuring linear displacements, another preferred embodiment employs a planar element having alternating opaque and transparent regions in the form of linear strips. This element is arranged for displacement in a direction perpendicular to the linear strips. Although the lens-prism combination or spherical mirror discussed above may be used as the image forming element, a cylindrical, concave mirror is preferred. The cylindrical mirror is arranged so that its optical plane is parallel to the linear strips. In this way, moving moire fringes are created as the planar element is displaced. As before, changing light levels due to fringe motion indicate displacement.

In yet another embodiment of the invention, multiple sensorheads are placed around the periphery of the disc at various angular locations. The combination of multiple sensorheads with a disc having an odd number of opaque sectors and an equal number of transparent sectors permits increased resolution and accuracy.

In a still further preferred embodiment of the invention, the circular disc is divided into inner and outer concentric bands. The inner band of the disc is encoded for absolute angle determination; the outer band is marked with alternating opaque and transparent sectors for measuring incremental angular changes as discussed earlier.

BRIEF DESCRIPTION OF THE DRAWINGS

The invention disclosed herein will be better understood with reference to the following drawings of which:

FIG. 1 is a simplified view of one preferred embodiment of the present invention. FIG. 2 is a view along section lines 2—2 of FIG. 1.

FIGS. 3A and 3B are views of alternative embodiments of the invention for measurement of angular displacements.

FIG. 4 is a simplified view of an embodiment of the invention for measurement of linear displacements.

FIG. 5 is a view along section lines 5—5 of FIG. 4.

FIG. 6 is a diagrammatic representation of a bi-lens detector.

DESCRIPTION OF THE PREFERRED EMBODIMENTS

Figure 3C:
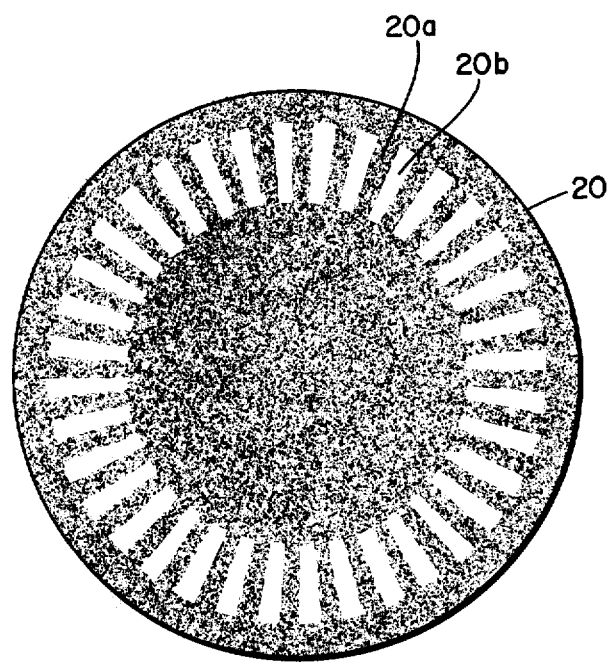
FIG. 3C shows a plan view of an exemplary disc for use with the embodiment of FIG. 3A.

Referring to FIG. 1, a disc 10 is mounted on shaft 11 which is rotatable about reference axis 11a. The surface of disc 10 includes a pattern of alternating opaque and transparent radial sectors. An exemplary eight sector disc 10 is shown in FIG. 2 for simplicity; in practice, however, the disc 10 will have many, typically several thousand, sectors. Disc 10 is illuminated by light source 12, preferably a light emitting diode or a diode laser. A non-light scattering element 13 is disposed between light source 12 and disc 10. An optical system 14 is located on the opposite side of disc 10 from source 12. System 14 includes a convex lens 15 mounted on the base face (opposite the 90° angle) of a 45°-90°-45° porro prism 16. The lens-prism combination is positioned so that disc 10 is at the plane of unit magnification of system 14 and so that an input surface of lens 15 opposite the 90° overlies a portion of the region of the disc including the pattern. With this configuration, system 14 creates a real image of a portion of the radial sectors which is erect about an axis normal to the radial sectors on disc 10 and which counter-rotates with respect to the angular rotation of the disc. The image is substantially in focus at the plane of the radial sectors, i.e., the sectors and their images are mutually conjugate. Because of the single axis image erection, the wide and narrow portions of the image of the radial sectors are superimposed respectively upon the wide and narrow portions of the sectors themselves. When the altitude plane of the prism passing through the base face is parallel to the direction of motion of the overlaid portion of the pattern, a nearly complete shuttering of light is accomplished, creating alternating light and dark areas as the disc 10 rotates. The alternating light and dark areas are sensed by detector 17.

When the altitude plane of the prism passing through the base face forms a non-zero angle with respect to the direction of motion of the overlaid pattern, moire fringes are generated from the superimposed image and the pattern itself. In this embodiment, detector 17 preferably includes a bi-lens detector (described below in conjunction with FIG. 6), permitting high precision detection of the center of luminosity of the overlaid region.

The output of detector 17 is processed by electronics (not shown) to indicate the angular orientation of disc 10. Because disc 10 is located at the plane of unit magnification of optical system 14, optical distortion, coma and lateral color aberration are identically zero.

FIG. 3A depicts another preferred embodiment of the invention with the sectors being alternately opaque and transparent. Circular disc 20 is mounted on shaft 21 which is rotatable about a reference axis 21a. The optical system comprises the single concave mirror 22 (shown in section) having a concave reflecting surface overlying and facing a portion of the pattern. The reflecting surface is located so that disc 20 is at the plane of unit magnification. This arrangement produces an image that is relatively free of aberration near the optical axis with respect to astigmatism and field curvature. In general, the image produced by mirror 22 is non-erected and counter rotates with respect to angular rotation of disc 20. In one form the reflecting surface is spherical (and has a characteristic optical axis 22a) and the optical axis 22a is offset from the reference axis 21a. In this case the interaction of the focused images of the sectors as they cross the sectors themselves because of the counter rotation gives rise to interference effects which appear as moving moire fringes. These bands are detected by light sensor 24, preferably a bi-lens detector.

In another form, the reflecting surface is cylindrical, having a cylindrical axis which is perpendicular to and intersects the rotational axis of the planar element (axis 21a). Where the cylindrical axis is perpendicular to the direction of motion of the sectors and that axis intersects with axis 21a, shuttering occurs which is detected by sensor 24. Where the cylindrical axis forms a non-zero angle with respect to the direction of motion of the sectors, moire fringes result, which are detected by sensor 24.

The accuracy of the embodiment depicted in FIG. 3A can be made very high. It is preferred that disc 20 have an odd number of opaque sectors and a like number of transparent sectors as shown in FIG. 3C, where the opaque sectors exemplified by sector 20a) are shown shaded, and the transparent sectors (exemplified by sector 20b) are shown unshaded. The combination of the use of odd numbers of sectors, with the use of additional similar sensorheads (the light source-imager-detector combination) disposed around the disc improves accuracy as compared with the use of a single sensorhead.

For illustrative purpose only, it will be assumed that disc 20 of FIG. 3A has 2001 opaque and 2001 clear sectors. Because the focused image of the sectors is moving in the direction opposite to the sectors themselves, a single revolution of the disc produces 4002 crossings of sectors and images of sectors. Each crossing produces the moving hyperbolic fringes which are sensed by detector 24. The output of detector 24 is essentially sinusoidal as the hyperbolic fringes sweep across its field of view. One period of the detector's output signal (360 electrical degrees) thus corresponds to $$(360 \times 60 \times 60)/4002 = 323.838 \text{ arc-seconds.}$$

Each detector period, however, includes two zero crossings as dark changes to light and back to dark again. By sensing the individual zero crossings, the basic accuracy is halved to approximately 161.919 arcseconds. If now a second sensorhead is introduced 90° from the first, the output signal of the second detector will be in quadrature with the first because of the odd number of sectors, again halving the basic accuracy to 80.960 arcseconds. Thus, each additional sensorhead halves the basic accuracy. With four sensorheads, for example, the basic accuracy is reduced to 20.240 arcseconds.

This basic accuracy can be improved up to four orders of magnitude by interpolating the signal from a bi-lens detector, for example having the form described below in conjunction with FIG. 6. It is the bi-lens' capability of very precisely locating the center of luminosity of a region which permits so precise an interpolation. Thus, an accuracy on the order of $2 \times 10^{-3}$ arcseconds is theoretically possible, although such accuracy is dependent upon gain bandwidth product limitations inherent in any electrical sensor system and because of factors such as air turbulence near the rotating disc and ruling inaccuracies during disc manufacture.

By using a disc with an odd number of each type of sector, accuracy is less affected by inaccuracies in locating the multiple sensorheads around the disc periphery. In this case, the ruling accuracy of the disc becomes the limiting factor. Basically the phase of the detected signal varies with the position of sensorhead around the disk. However, with an odd number of sectors, the rate of this phase variation with position is lower than the corresponding rate for an even number of sector pattern. As a result, there is greater freedom in positioning the sensorheads in the odd numbered sector embodiments, while maintaining the same accuracy. Another source of error with shaft encoders occurs because the encoded disc is mounted eccentrically on the rotatable shaft. The errors resulting from such eccentricity can be compensated by using four sensorheads located 90° apart and electrically manipulating the signals from the four detectors.

FIG. 3B shows another embodiment which is similar to the embodiment of FIG. 3A. In this figure, elements corresponding to those in FIG. 3A are denoted by the same reference designations. In FIG. 3B, the mirror 22 is replaced by a mirror-lens combination which includes a mirror 33 having a planar reflecting surface overlying and facing a portion of the pattern on disc 20, and a convex lens 34 (with optical axis 34a) positioned between mirror 33 and planar element 20. Generally, this embodiment operates in the same manner as the concave mirror embodiment of FIG. 3A, with cylindrical lens configurations corresponding to the cylindrical mirror configurations and the spherical lens configurations corresponding to the spherical mirror configurations.

Referring now to FIG. 4, depicted is an embodiment of the invention for measuring linear displacement. In this exemplary embodiment, planar element 40 is arranged for displacement along a reference axis 40a, i.e. to the left or right in FIG. 4. Element 40 has alternating opaque and transparent linear elongated rectangular sectors on its surface as shown illustratively in FIG. 5. Any of the optical system described above in conjunction with FIGS. 1, 3A and 3B may be used with the element 40 to provide an indication of the displacement of element 40 along axis 40a. By way of example, light source 41 illuminates these elongated sectors so that mirror 42 having a cylindrical reflecting surface may form an image of the sectors which moves in the direction opposite to the displacement of element 40. Mirror 42 is located so that element 40 lies in the plane of unit magnification of mirror 42. As element 40 moves, the image of the sectors and the sectors themselves are superimposed. Where the cylindrical axis of mirror 42 is not parallel to the longitudinal axes of the sectors, the interaction of the image and pattern creates moving moire fringes. Where the cylindrical axis is parallel to the longitudinal axes, shuttering is detected at sensor 43. This fringe pattern is detected by bi-lens detector 43 which produces a measure of the linear displacement of element 40.

With the porro prism-lens combination in the optical system, the prism may have its optical plane substantially parallel to the direction of motion of the planar element. In this configuration, the lens may be spherical element or may be cylindrical with the cylindrical axis of the lens forming a non-zero angle with respect to the direction of motion of the planar element. Alternatively, the prism may have its optical plane form a non-zero angle with respect to the longitudinal axes of the elongated sectors. In this latter configuration the lens may be spherical or may be cylindrical with cylindrical axis forming a non-zero angle with respect to the altitude plane.

FIG. 6 shows the bi-lens detector 17. Detector 17 includes objective lens 80 which forms an image of a light source 73 at the plane of the bi-lens 81. In the present embodiment, bi-lens 81 is composed of two convex lenses that have been cut and joined together as illustrated in the figure. Each of the two sections of bi-lens 80 forms an image at the two solid state light sensors 82. Each light sensor 82 is a light sensitive pin diode connected as shown in the figure. The electrical outputs of these two sensors 82 are differenced, the resulting signal indicating the location of the center of luminosity of source 73.

The apparatus for precise measurement of linear and angular displacements disclosed herein, therefore, is both easy to manufacture and relatively inexpensive. More importantly, the apparatus employs but a single encoded element and an optical system of a single or very few optical surfaces which is virtually aberration free. The small number of parts required and their unique arrangement as disclosed herein leads to an optical measuring apparatus more highly stable and accurate than before known.

In view of the foregoing, it may be seen that the objects of the present invention have been achieved and other advantageous results attained. As various changes could be made in the above preferred embodiments without departing from the scope of the invention, it should be understood that all matter contained in the above description or shown in the accompanying drawings shall be interpreted as illustrative and not in a limiting sense.

What is claimed is:

1. Apparatus for measuring angular displacement of a reference element about a reference axis, comprising:
    (A) a planar element coupled to said reference element and having a pattern of sectors characterized by different optical transmission coefficients alternating in the direction of said displacement, wherein said pattern is an annular pattern of radial sectors, and said pattern has an odd number of radial sectors characterized by each of said optical transmission coefficients, and wherein said planar element is coupled to said reference element so that said pattern rotates about said reference axis with said radial sectors lying in a plane perpendicular to said reference axis as said reference element rotates about said axis, and
    (B) two or more optical means for generating real images of a portion of said pattern passing an associated reference point, and for superimposing said real images on said portions of said pattern, whereby said superimposed images and said portions move in opposite directions as said planar element moves,
    (C) detecting means associated with each of said optical means for detecting the optical density of regions of said superimposed image and said portions of said pattern at the respective reference points.

2. Apparatus according to claim 1 wherein said alternate sectors are transparent and opaque, and
wherein said optical means includes:
    a convex lens-mirror combination including a mirror having a planar reflecting surface overlying and facing said portion of said pattern on a first side of said planar element, and a convex lens positioned between said reflecting surface and said planar element, and
    an associated illuminating means disposed on the second side of said planar element for illuminating said portion of said pattern passing said reference point, said mirror and illuminating means being arranged to generate and superimpose said image on said portion of said pattern, and
wherein said detecting means includes:
    sensing means disposed on said second side of said planar element for detecting the optical density of said region of said superimposed pattern and said portion of said pattern.

3. Apparatus according to claim 1 wherein said alternate sectors are transparent and opaque, and
wherein said optical means includes:
    a convex lens-prism combination having an input surface overlying and facing said portion of said pattern on a first side of said planar element, and
    an associated illuminating means disposed on the second side of said planar element for illuminating a portion of said pattern passing said reference point, said combination forming an image of said sectors erected about an axis normal to said radial sectors and counter-rotating with respect to said angular rotation of said disc, whereby the wide and narrow portions of the radial sectors of said image are superimposed respectively upon the corresponding wide and narrow portions of said radial sectors of said pattern, and
wherein said detecting means includes:
    sensing means disposed on said second side of said planar element for detecting the optical density of said region of said superimposed pattern and said portion of said pattern.

4. Apparatus according to claim 3 wherein said convex lens-prism combination includes a 45°-90°-45° porro prism and a convex lens coupled to the base face of said prism, said base face being the face opposite the 90° angle, said base face being parallel to the plane of said planar element.

5. Apparatus according to claim 4 wherein the altitude plane of said prism passing through said base face is substantially parallel to the direction of motion of said overlaid portion of said pattern.

6. Apparatus according to claim 4 wherein the altitude plane of said prism passing through said base face forms an acute angle with respect to the direction of motion of said overlaid pattern.

7. The apparatus according to claim 6 wherein said detecting means includes a bi-lens detector.

8. Apparatus according to claim 1 wherein said alternate sectors are transparent and opaque, and
wherein said optical means includes:
    a mirror having a concave reflecting surface overlying and facing said portion of said pattern on a first side of said planar element, and
    an associated illuminating means disposed on the second side of said planar element for illuminating said portion of said pattern passing said reference point, said mirror and illuminating means being arranged to generate and superimpose said image on said portion of said pattern, and
wherein said detecting means includes:
    sensing means disposed on said second side of said planar element for detecting the optical density of said region of said superimposed pattern and said portion of said pattern.

9. Apparatus according to claim 8 wherein said reflecting surface is spherical and the optical axis of said mirror is parallel to and offset from said reference axis.

10. Apparatus according to claim 8 wherein said reflecting surface is cylindrical and the cylindrical axis of said mirror is perpendicular to and intersects said reference axis.

11. Apparatus according to claim 8 wherein said reflecting surface is cylindrical and wherein the cylindrical axis of said mirror is perpendicular to said reference axis and forms a non-zero angle with respect to the direction of motion of the portion of said planar element underlying said mirror.

12. The apparatus according to claim 1 wherein said detecting means includes a bi-lens detector.

13. Apparatus according to claim 2 wherein said convex lens is spherical and the optical axis of said lens is parallel to and offset from said reference axis.

14. Apparatus according to claim 2 wherein said convex lens is cylindrical and the cylindrical axis of said lens is perpendicular to and intersects with said reference axis.

15. Apparatus according to claim 2 wherein said convex lens is cylindrical and wherein the cylindrical axis of said lens is perpendicular to said reference axis and forms a non-zero angle with respect to the direction of motion of the portion of said planar element underlying said lens-mirror combination.

* * * * *